FIG-4 "AND" GATE
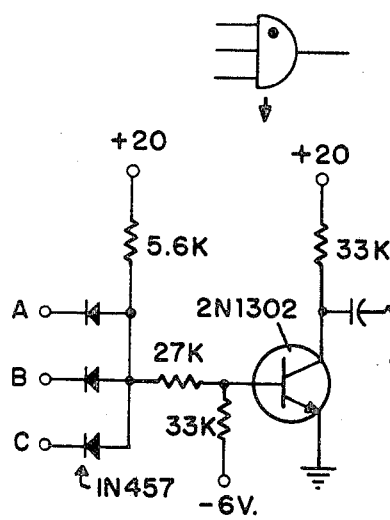
FIG-5 "OR" GATE
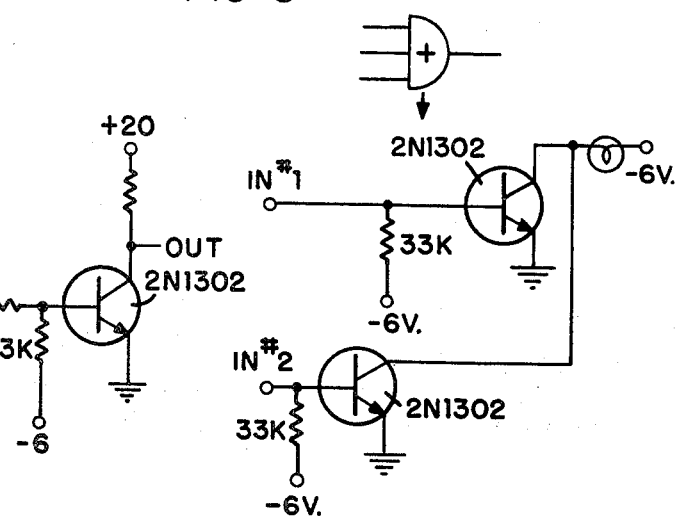
FIG-6 "INVERTER"
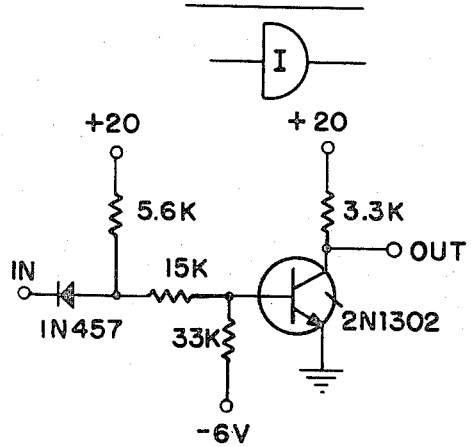
FIG-7 "FLIP-FLOP"
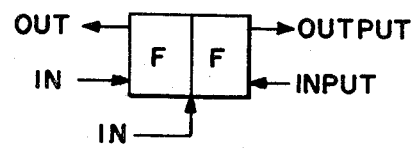
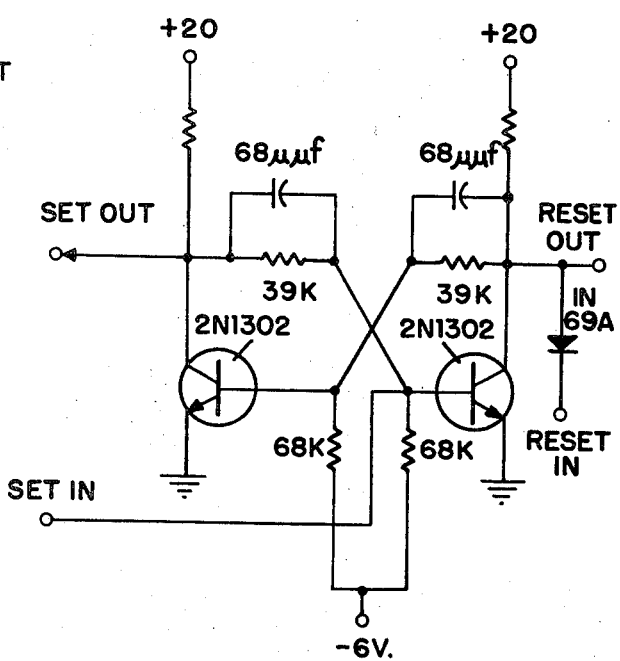

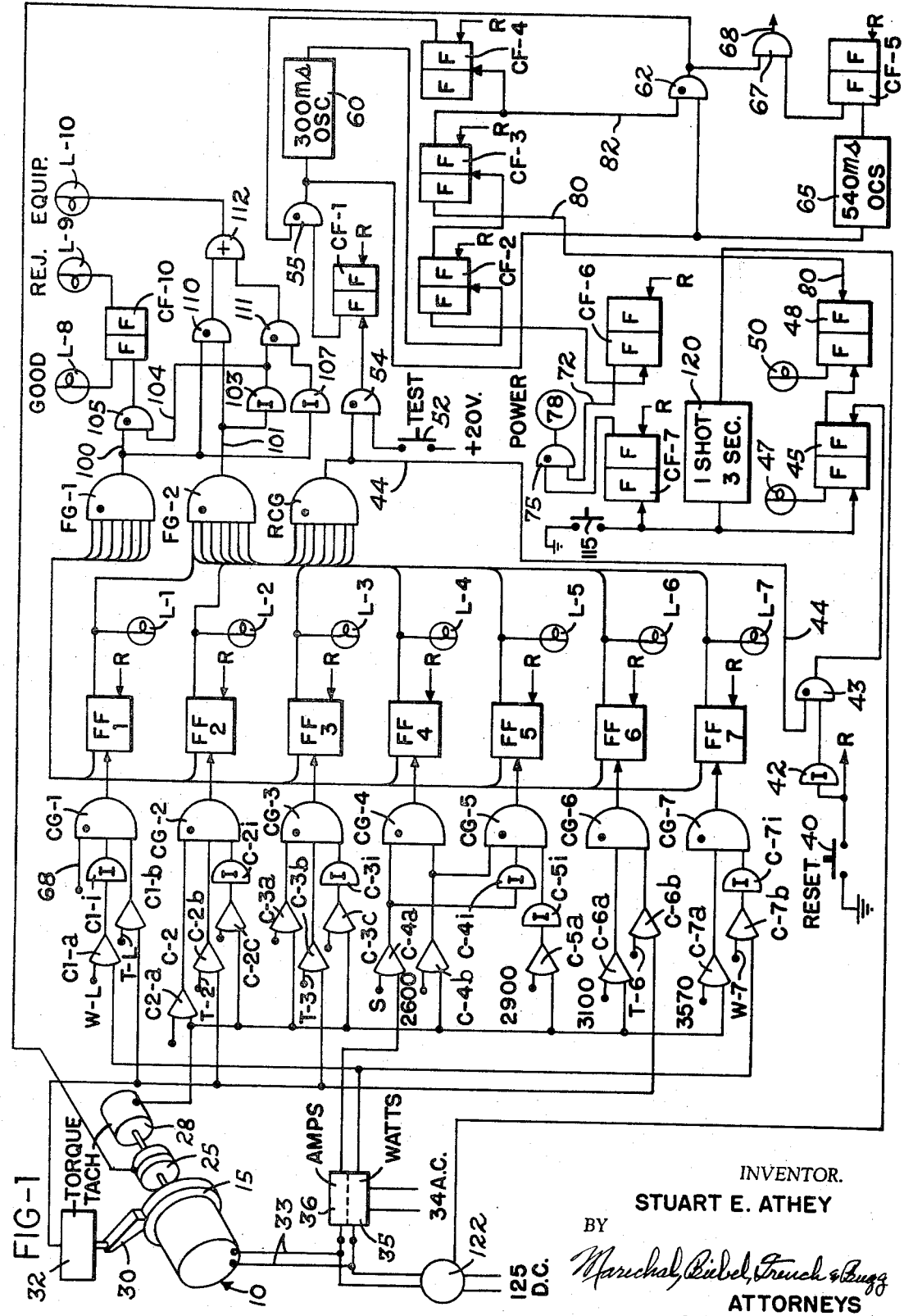

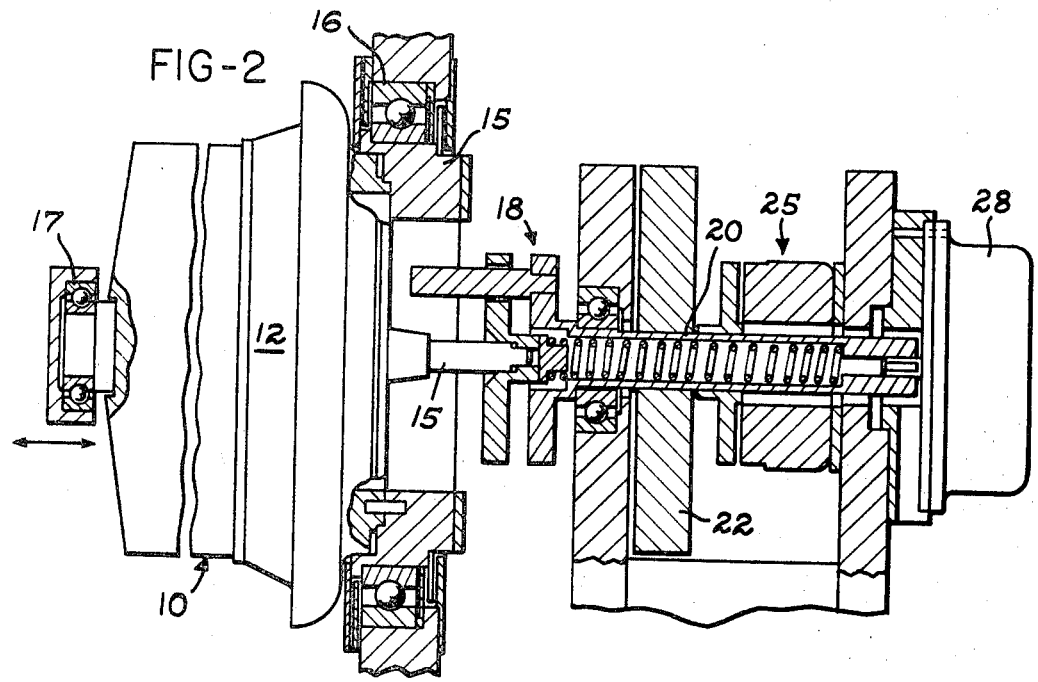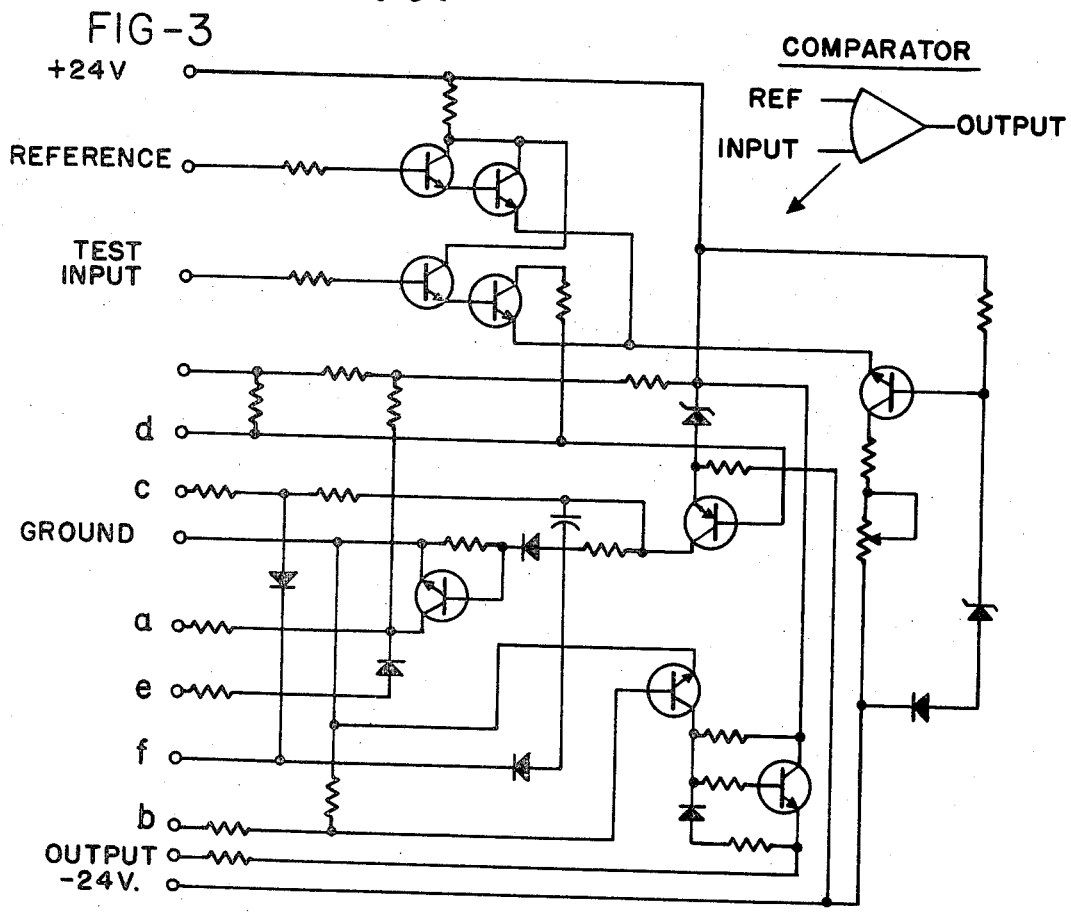

Sept. 24, 1968   S. E. ATHEY   3,402,600
ELECTRIC MOTOR TESTING APPARATUS
Filed June 24, 1966   4 Sheets-Sheet 4
FIG-8  CURRENT TRANSDUCER
FIG-9  WATTS TRANSDUCER
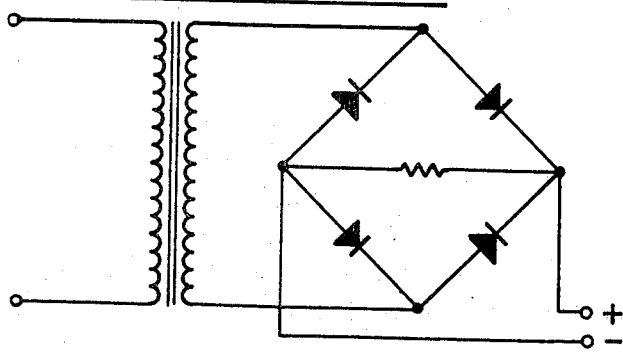
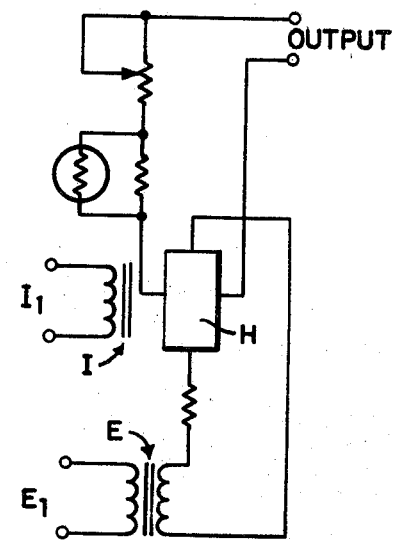
FIG-10
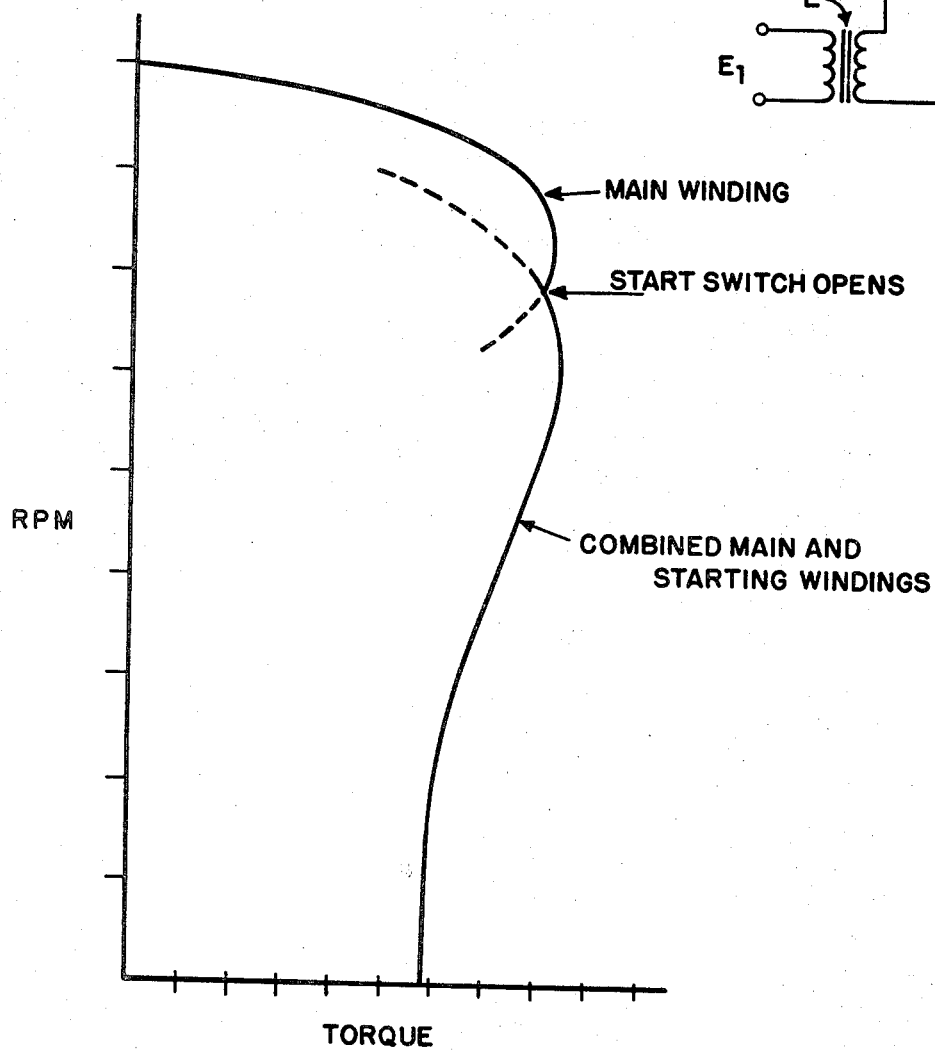

United States Patent Office 3,402,600
Patented Sept. 24, 1968

3,402,600
ELECTRIC MOTOR TESTING APPARATUS
Stuart E. Athey, Troy, Ohio, assignor to The Hobart Manufacturing Company, Troy, Ohio, a corporation of Ohio
Filed June 24, 1966, Ser. No. 560,308
12 Claims. (Cl. 73—133)

ABSTRACT OF THE DISCLOSURE

The application discloses a novel testing apparatus capable of rapid dynamic testing of electric motors, including performance of a locked rotor torque test if desired. The motor under test is driven through a complete excusion of its torque speed curve under inertial loading, permitting quick testing, since an electric motor will accelerate to its rated speed along this same curve under any inertial load. In some cases the rotor mass itself may be sufficient inertial load. The load required for the test need be only sufficient to cause the motor to transverse its acceleration curve slowly enough to accommodate the response time of the transducers used. The testing procedure is a go-no go logic arrangement, incorporating readily available items and commercially available transducers. At the end of each test the motor is dynamically braked, thereby removing the energy created during the test as heat energy in the motor.

Background of the invention

This invention relates to apparatus for testing individual electric motors and the like, for example to determine whether the motors are capable of producing desired output torque and speed within certain predetermined power consumption requirements, and for testing also the capability of the motors to accelerate within certain specifications.

In the manufacture of electric motors, for both AC and DC operation, it is necessary to test both newly manufactured and reconditioned motors to determine whether the motors are capable of achieving certain performance characteristics for which they are designed. In practice, especially where motors are mass produced, it is often the policy of the manufacturer to group the motors in batches and test only selected ones of the batch, and to accept or reject the entire batch depending upon the performance of those motors which are tested. Statistically, this testing procedure will result in a high percentage of acceptable motors, but it is always possible that some defective motors will be included in an acceptable batch.

Where a higher degree of reliability is desired, the alternative is to test every motor, and this can be a time consuming and expensive operation, and usually requires the services of experienced technicians, who are capable of interpreting the test results and, in the case of those motors that fail a test, determining the cause of such failure so that it can be corrected if possible. When one hundred percent testing is desired, either additional personnel or additional time is required to perform the test operation on every motor.

A principal reason for this extra burden of individual testing is that it is generally accomplished by point to point loading of the motor at preselected points along its ideal performance curve (torque vs. speed), usually employing a dynamometer.

However, it is characteristic of any electric motor that it will traverse its performance curve, and exhibit its complete performance characteristics, under an inertial load. A relatively small inertia load, in some cases the rotor itself, is sufficient to load the motor enough for dynamic testing according to the invention, such that the performance sensing transducers can follow over the complete performance curve. Successful dynamic testing of fractional horsepower induction motors has been accomplished at rates of three units per minute, with the actual test requiring only about two seconds, the remaining time occupied by loading and unloading from the test apparatus.

Summary of the invention

The primary objective of this invention is to provide testing apparatus which can be used by unskilled personnel, and which can quickly determine whether or not the motor under test is capable of performing within predetermined specifications.

Another important object of the invention is to provide a go; no-go type of testing apparatus which will quickly and automatically determine whether an electric motor, or similar device, is capable of performing within predetermined specifications, and in the event of a detected failure of a motor to pass the test, to indicate in what respect the tested motor is deficient.

A further object of the invention is to provide such testing apparatus which is capable of dynamically testing a motor from starting through full speed operation in a short time, thereby making one hundred percent testing of the motors an economical possibility.

An additional object of the invention is to provide such a motor testing device which incorporates readily available electronic logic circuits that are reliable over long periods of use, and which are capable of testing motor performance to relatively close tolerance.

Another object of the invention is to provide such a motor testing apparatus which includes self-checking circuits which will indicate when an error has occurred in the testing device, in order to minimize the possibility that motors are being rejected incorrectly due to some internal failure of the testing apparatus.

Another important object of the invention is to provide a motor testing apparatus which is capable of testing the motor under locked rotor conditions, as well as testing the acceleration and full speed characteristics of the motor, and in the case of AC motors employing a starting system, checking the accuracy of the speed responsive starting devices which are adapted to disconnect the starting system of the motor as the motor comes up to its operating speed.

Other objects are to provide a motor testing device which makes available signals representing motor parameters, such as watts, torque, volts, amperes, and speed, under dynamic conditions, and terminals by means of which these parameters can be connected to various display devices, such as an oscilloscope, for observation and for comparison of the various parameters with respect to each other or to time.

Other objects and advantages of the invention will be apparent from the following descriptions, the accompanying drawings, and the appended claims.

Brief description of the drawings:

FIG. 1 is a logic diagram of a testing apparatus constructed according to the invention, including schematic representation of some of the mechanical parts of the apparatus;

FIG. 2 is an enlarged view, partly in section, and with the motor broken to shorten its length, showing the mechanical features of the testing apparatus;

FIGS. 3 through 7 are schematic diagrams showing the basic logic symbols used in FIG. 1 with typical circuits corresponding to these symbols;

FIGS. 8 and 9 are diagrams of suitable watt and current transducers; and

FIG. 10 is a diagram of a typical ideal performance curve of a motor to be tested.

Description of the preferred embodiment

Referring to the drawings, which illustrates a preferred embodiment of the invention, and particularly with reference to FIG. 2, an electric motor 10, which is to be tested, is mounted in the test apparatus with its stator 12 (in the illustrated example, the stator is the housing) connected to and supported by a rotatably mounted cradle 15, including a stationary bearing 16 and movable bearing 17 which are mounted on suitable framework. Details of this mounting are not important and are not described in detail. The rotor member of the motor, including its output shaft 15 is adapted to engage in a coupling 18 and this coupling in turn is connected to a rotary shaft 20, mounted in suitable bearings in the test apparatus. The shaft 20 carries an inertia load, particularly in testing small motors, in the form of a cylindrical weight 22 which is fixed to the shaft to be rotated by it. An electrically operated brake 25 is also connected to the shaft for the purpose of holding the shaft against rotation during a portion of the test procedure. The speed of shaft 20, and hence the rotational speed of the motor output is measured by an electric tachometer 28 which is also connected to the shaft 20, and which produces an output signal in the form of a varying voltage related to the r.p.m. of the shaft. Hence the tachometer functions as a speed responsive transducer.

The cradle 15 is provided with an outwardly extending arm 30 (FIG. 1) which operates against a transducer 32 that translates the force exerted thereon by the arm 30 into a variable electrical signal. This signal is related to the torque acting to rotate the stator 12, which is free to rotate in bearings 16 and 17, during the testing operation. The power supply lines 33 to the motor 10 are connected for test purposes to receive electrical power from a supply source (not shown) which will be appropriately AC or DC supply, depending upon the type of motor being tested. In the example illustrated, the motor is a split phase start induction motor, hence the supply is AC. This supply is made available to the motor 10 through suitable transducers 35 and 36 which are respectively, a power measuring transducer such as shown in FIG. 9, and a current measuring transducer as shown in FIG. 8, providing outputs coresponding to the power and current drawn by the motor under test.

FIGS. 3 through 9 illustrate symbols used in FIG. 1, which is essentially a logic diagram, and together with these symbols there are illustrated schematic diagrams of typical circuits which can be employed for the function designated by the logic symbol. These circuits are well known, and are readily understood by those skilled in the art, hence they will be described only in a general way. It should be understood that equivalent circuits are available to perform the same functions as denoted by the logic symbols.

FIG. 3 illustrates a comparator gate circuit, and actually the corresponding schematic diagram also includes an inverter function which is available and is used in some portions of the apparatus. The comparator gate circuit is an operational amplifier to which a reference voltage signal is applied on the reference input line, which is appropriately labeled. This signal may be obtained, for example, from a suitable regulated voltage source (not shown) through an adjusting device such as a potentiometer. The input for test purposes is applied to the connection labeled "test input" and the output is obtained from the connection which is so labeled. Connections for power supply are also appropriately labeled. The comparator circuit can be used in two different modes. If the connection $a$ is wired to the connection $b$, there will be an output signal whenever the value of the test input signal is less than the reference input signal. If the connection $c$ is assigned to the connection $b$, there will be an output signal whenever the test input signal equals or exceeds the reference input. Also, by connecting the contacts $d$ and $e$, the comparator circuit can include a latching function, so that it will retain its output once it is achieved, until a reset signal is applied over contact $f$.

For purposes of the present system, an input signal will be considered to be at a high level, for example plus 20 volt DC and lack of input signal will be considered as a low level ground or zero volts.

The test circuit embodies a plurality of comparator circuits, shown by way of example as the AND gate circuits labeled CG–1 . . . CG–7. The outputs of these comparator AND gates are connected to the "set" inputs of corresponding bistable devices, illustrated as the memory flip-flops FF–1 . . . FF–7. These are conventional flip-flop circuits which will remain in one of two states until a signal is received which is capable of changing the flip-flop to its other state. By way of explanation, FIG. 7 shows the typical connections to a flip-flop circuit as used herein. A signal on the set input will cause a signal to appear on the set output, and this signal will remain until a signal appears either on the pulse (transfer) input, or on the reset input. An input signal at the reset input will cause an output signal at the reset output. Inputs to either the set or reset inputs will cause a change in state if the opposite output exists at the time, but if the corresponding ouput exists then no change occurs. A signal at the pulse input will cause the flip-flop circuit to change state no matter what state exists at the time of such input. All of the set outputs of the circuits FF–1 through FF–7 are connected to provide separate inputs to the final AND gate circuit FG–1. Similarly, all the reset outputs of these flip-flop circuits are connected to the final AND gate FG–2. The reset inputs to the flip-flop circuits FF–1 . . . FF–7 are available from the reset circuit, and hence are labeled with the letter R. In addition to the connections to the final AND gate FG–2, each of the reset outputs of these flip-flop circuits also is connected to a corresponding indicator means, shown in the form of lamps L–1 . . . L–7, to provide an indication as to whether or not the related flip-flop circuit changed state during the test operation. Also each of the reset outputs of these flip-flop circuits is connected into a reset check gate RCG, which is an AND gate circuit having its output connected to the control logic.

Referring to FIGS. 4–7, the symbols used in FIG. 1 are illustrated for purposes of explanation, together with typical circuits. The AND gate circuit (FIG. 4) provides an output only if all three of its inputs A, B, and C are present. The OR gate circuit (FIG. 5) provides an output signal if any of its inputs is present. The inverter circuit (FIG. 6) provides an output whenever its input signal is not present, and conversely does not present an output signal when its input is present. For purposes of example, in the system described herein an input signal will be considered to be a +20 volt DC (high level) and lack of an input signal will be considered as ground or zero voltage (low level). Conversely, negative logic can be used.

FIG. 8 shows a typical current measuring transducer, in which the current drawn by the motor is sensed across the primary winding of a transformer, and the secondary winding applies a proportional current to a bridge rectifier, whose output is a variable DC signal. FIG. 9 shows a typical watts transducer in which the voltage is applied across the transformer E, current is applied across the contacts I, and a Hall effect device H produces a variable DC output signal.

The testing apparatus includes three normally open manually operable control switches. The reset switch 40 will, when closed, provide a connection between ground potential (zero voltage) and all of the reset connections in the circuit, which are labeled R. In addition, the reset switch 40 is connected to an inverter circuit 42 and the output of this inverter circuit provides one of the inputs to an AND gate 43. The other input to this AND gate, throughline 44, is derived from the output of the reset check gate RCG. The output of AND gate 43 is directed to the reset input of a flip-flop circuit 45. The set or A output of this flip-flop circuit controls an indicator lamp 47, which functions as the reset indicator and will be illuminated whenever a test operation has been completed but the apparatus is not prepared for the next test. When output signal from AND gate 43 is directed to flip-flop 45, this will reset the flip-flop and the lamp 47 will be extinguished. At the same time the reset output of flip-flop 45 is connected to the set input of a further flip-flop 48, and its set output controls a further indicator lamp 50. When this lamp is illuminated, it indicates that the apparatus is prepared for a test.

Assuming that the reset function has occurred by closing switch 40 momentarily, and assuming that a motor to be tested has been mounted in the cradle 15 with its output shaft coupled to shaft 20. The operator may depress and close the test switch 52. This connects a +20 volt signal to the AND gate 54, and the other input to this AND gate is from line 44 which is the output of the reset check gate RCG. Therefore, if the reset function has been properly accomplished, there will be an output from the AND gate 54 and this is directed to the first control flip-flop CF–1, to its set input. Since this flip-flop was reset during the reset operation, it will now change state and an output will appear at its set output line which leads to an AND gate 55. The other input to this AND gate is derived from the reset output of the fourth control flip-flop CF–4, and since it has been reset, this output signal is present and an output will occur from the AND gate 55. This output can accomplish three functions.

First of all, the output from AND gate 55 is connected to turn on an oscillator or pulse generator circuit 60. This oscillator is constructed to produce an output every 300 milliseconds, therefore an output signal from AND gate 55 will result in an output from the oscillator 60 after a 300 millisecond lapse in time, and these pulses will continue at this same timing until the AND gate 55 is inhibited. The output of AND gate 55 also is directed to a further AND gate 62, and an additional input to that AND gate is derived from the reset output of the control flip-flop CF–3. This output is present because the reset function has reset CF–3 previously. Therefore, an output signal is available from AND gate 62 and this output is connected to energize the brake 25, which in turn clamps the shaft 20 against rotation.

The third function of the output of AND gate 55 is to start the operation of an oscillator circuit 65. This oscillator circuit may be of the same type as oscillator 60, however, the oscillator 65 has different timing being constructed to emit output pulses every 540 milliseconds. The output pulses from oscillator 65 are directed to the set input of the control flip-flop CF–5, and the set output of this flip-flop circuit is directed to a further AND gate 67 which also has an input from the output of AND gate 62. Thus, when the brake 25 is applied, the AND gate circuit 67 receives one input signal, but it is inhibited until CF–5 is set, which results in a timing output at output line 68 of gate circuit 67. This output is directed to one of the inputs of the first comparator AND gate CG–1.

The output pulses from the oscillator 60 are directed to the pulse input of control flip-flop CF–2, thus any pulse from this oscillator will cause CF–2 to transfer from whatever state it is in to the opposite state. Having been reset, the first pulse from oscillator 60 causes CF–2 to shift to its set condition and the resultant set output line 70 is connected to the set input of control flip-flop CF–6. This results in an output on line 72 from the set output of CF–6 to the control AND gate 75. This signal enables the gate 75, since its other input is from the reset output of control flip-flop CF–7, which was reset at the start of the operation. An output results from AND gate 75 and this causes the power control 78 to be enabled, in turn applying power to the lines 33, which are connected to the motor under test.

This commences the actual testing of the motor, however, before considering the test procedures in detail, it is desirable to explain the remaining operations of the control circuits previously discussed. The next pulse from oscillator 60 (at 600 milliseconds) will transfer CF–2 back to its reset state, and its reset output is connected to the pulse input of CF–3. Therefore, CF–3 transfers to its set condition, and its set output is connected through line 80 to the flip-flop 48, to its reset input. Therefore, this flip-flop is reset on the second pulse from oscillator 60 and the test indicator lamp 50 is extinguished, indicating to the operator that the test is underway. At the same time, gate 62 and gate 67 are inhibited.

The next pulse from oscillator 60 to CF–2 transfers CF–2 to its set condition, but the output on line 70 has no effect, since CF–6 is already in its set condition. Before the next or fourth pulse from oscillator 60, there is a second output pulse from oscillator 65 (at 1080 milliseconds) however, this also has no effect since CF–5 is already in its set condition. The fourth pulse from oscillator 60 causes CF–2 again to transfer to its reset condition and a further pulse is propagated to the pulse input of CF–3, causing it to transfer to its reset condition. It should be noted that on the second pulse from oscillator 60, when CF–3 was set, this removed the output signal from the reset output line 82 of CF–3, inhibiting AND gate 62 and releasing the brake 25 and inhibiting gate 67. Now, on the fourth pulse CF–3 is again reset and the AND gate 62 would appear to be enabled. However the reset output of CF–3 also is connected through line 83 to the pulse input of CF–4, and it shifts to its set condition, removing the signal from its set output 85. This inhibits AND gate 55 and disables both oscillators 60 and 65, and at the same time inhibits the other input to AND gate 62. Therefore, the brake 25 remains de-energized and other test operations on the motor continue.

*Locked rotor torque test*

With the rotor locked against rotation by brake 25, and power applied to the motor, the output of the torque transducer 32 must be at least equal to the reference setting to the comparator circuit C–1b, in order to have the desired output from this circuit. Referring to FIG. 3, which shows a typical comparator circuit, such as is commercially available, as previously explained, a signal level at the input pin must equal or exceed the level of the reference signal applied to the reference input pin before the level of the output signal can rise to the desired value.

The output of the comparator circuit C–1b is connected to one of the inputs of the comparator AND gate CG–1. Another input to this gate circuit is from the timed reference 68. The third input to CG–1 is from the comparator circuit C–1a through an inverter circuit C–1i. Therefore, the signal output from C–1a which is actually applied to CG–1 is always opposite to the actual output from C–1a. The reference input to C–1a is set to a value corresponding to the maximum desired power which the tested motor should draw with its rotor locked. This input is labeled W–L, meaning that the setting corresponds to watts with the rotor locked. The test input of C–1a is from the watts transducer 35 through which the power applied to the motor passes and is measured.

If the locked rotor torque exceeds the desired value C–1b will enable CG–1, and if the power drawn by the motor at this time does not exceed the desired maximum, C–1i will enable CG–1. If both these inputs occur when the timing input on line 68 (from AND gate 67) occurs to indicate that the test is under way, there will be an output from CG–1, which is connected to set the first memory flip-flop FF–1. The set output of FF–1 will therefore enable the first input to the main test AND gate FG–1, and at the same time the first inputs to the equipment check AND gate FG–2 and to the reset check gate RCG will be inhibited. Also, the indicator lamp L–1 will be extinguished, indicating that the motor has passed the locked rotor test. Shortly thereafter, as previously explained, the AND gate 62 is inhibited by the timing controls and this releases brake 25 permitting the motor to accelerate. At the same time, AND gate 67 is inhibited and its output 68 then inhibits CG–1 from further operation.

If for some reason the motor under test does not exert sufficient torque during the locked rotor test there will be no enabling output from C–1b during the time of this test. Similarly, if the motor draws excessive power, there will be an output from C–1a which will be inverted to inhibit CG–1. In either event, or both, CG–1 will be inhibited during the time that an enabling signal appears at its input 68, thereby the memory flip-flop FF–1 will not be set and lamp L–1 will remain energized to indicate that the motor has failed the locked rotor test. Similarly, the first input to FG–1 will remain inhibited, and regardless of all that may occur with respect to the other inputs to this AND gate during further testing of the motor, there can be no output from FG–1 to indicate that the motor passed the entire test.

Acceleration torque tests

When the brake 25 is released the motor 10 is allowed to accelerate. When the output from the tachometer 28 reaches a value corresponding to 1150 r.p.m., this value will equal the reference input to comparator circuit C–2a, and its output will rise to present an enabling input to the next comparator AND gate CG–2. The tachometer output has not yet reached a level corresponding to 1250 r.p.m. and the output of the second speed comparator C–2c will remain at a lower level, and this is connected to an inverter circuit C–2i, and its output will remain at a higher level to provide a further enabling signal to the AND gate CG–2. Therefore, the first acceleration test will occur in the speed range between 1150 and 1250 r.p.m., since only during this range are both speed inputs to the AND gate CG–2 enabled. Outputs from the torque transducer 32 is connected to comparator circuit C–2b, and its reference input, labeled T–2, is set at a level for the minimum desired torque available from the motor at this point in its starting operation. So long as the torque transducer output is at least equal to, or exceeds, the reference signal T–2, there will be a third enabling output from comparator C–2b to the AND gate CG–2, and in this event its output will set the second memory flip-flop FF–2. As previously, the change of state of the memory flip-flop causes several functions. First, the second input to the AND gate FG–1 will be enabled, and also the lamp L–2 will be extinguished and the second inputs to the AND gate FG–2 and RCG will be inhibited. In the event that the motor does not produce the desired torque in this speed range, there will be no output from AND gate CG–2, and flip-flop FF–2 will remain set, therefore inhibiting the second input to FG–1 and also leaving the indicator lamp L–2 energized.

A further accelerating torque test can be accomplished in like manner if desired. In the illustrations available the output of the tachometer 28 also is connected to comparator circuit C–3a and to comparator circuit C–3c. The latter comparator is in turn connected to an inverter of the C–3i. The outputs of C–3a and C–3i are connected to a third comparator AND gate CG–3. The third input to this AND gate is from the torque testing comparator circuit C–3b. Thus, a further acceleration torque test can be accomplished at the higher speed. In a typical case, the test input to C–3a is set to a level corresponding to 1750 r.p.m., and the test input to C–3c is set at a level corresponding to 1850 r.p.m. The torque reference input T–3 to the comparator C–3b is set at a level corresponding to the minimum desired torque from the motor within this speed range. If this torque is reached, the output of CG–3 will set the memory flip-flop FF–3, thereby extinguishing lamp L–3 and enabling the third input to AND gate FG–1, and inhibiting the corresponding inputs to FG–2 and RCG. For the same reasons as given above, if the torque output within this speed range does not reach the desired minimum, FF–3 will not be set, lamp L–3 will remain energized, and the third input to FG–1 will be inhibited.

Starting switch cut-out test

Particularly in the testing of AC induction motors which employ a starting system, it is desirable to determine and check the timing of the opening of the switch, which usually is centrifugally operated, which controls the supply of power to the starting winding. As is well known, the centrifugal actuator for this switch is driven by the motor shaft, and will function to open the starting switch at a predetermined speed during acceleration of the motor. It is desirable to maintain this switch opening within a given range of speeds. In the illustrated example, the switch should open no sooner than at 2600 r.p.m., and no later than at 2900 r.p.m. The opening of this switch can be sensed by measuring the current drawn by the motor, hence the output of the ammeter control 36 should decrease by a significant amount when the switch opens and the starting system is out of the motor circuit.

As shown in FIG. 1, the output of the ammeter transducer 36 is connected to the input of the comparator present in 4a. Once electrical power is applied to the motor at the beginning of the test, since the motor starting switch is closed, the input to the comparator C–4a will exceed the reference input before, hence there will be a high level output from this comparator circuit to the AND gate circuit CG–4. The output of comparator C–4a also is connected through an inverter circuit C–4i to one of the inputs of the AND gate circuit CG–5. The tachometer output is connected to the test input of comparator circuit C–4b, and its reference input is set to correspond to 2600 r.p.m. Therefore, the output of C–4b will be at a low level, and is connected to inhibit both AND gate circuits CG–4 and C–G5 until the tachometer output equals or exceeds 2600 r.p.m. At that time the output of C–4b will go to a higher level and provide enabling signals to both AND gates.

Therefore, if the speed exceeds 2600 r.p.m., and C–4b enables CG–4 at a time prior to opening of the centrifugal starting switch, C–4a will still be at a high level and the AND gate circuit CG–4 will produce a high level output to set the memory flip-flop FF–4. As previously, this extinguishes the corresponding lamp L–4, provides a signal on the fourth input to AND gate circuit FG–1, and provides an inhibiting signal to the corresponding fourth inputs to AND gate circuit FG–2 and RCG. Should the centrifugal starting switch open prematurely, before 2600 r.p.m., there will be no output from CG–4 and lamp L–4 will remain energized.

The tachometer output is also connected to the test input of comparator circuit 5a, and the output to this comparator circuit leads to the inverter circuit C–5i, which in turn leads to a third input to the AND gate circuit CG–5. Due to the inverter circuit, if the speed is below 2900 r.p.m. the third input to AND gate circuit CG–5 will be enabled. To obtain an output from CG–5 it is necessary that the centrifugal starting switch be open, to cause a higher level signal at the output of C–4i, also that the speed be in excess of 2600 r.p.m. to cause a higher level at the output of C–4b, and that the speed not having reached 2900 r.p.m. in order to maintain a higher level output from C–5i.

If all these conditions occur, flip-flop FF–5 will be set by an output from CG–5, the fifth input to FG–1 will be enabled, lamp L–5 will be extinguished, and the fifth inputs to FG–2 and RCG will be inhibited. It follows that if there is no output from CG–5, the cause will be a failure of the centrifugal starting device to open before 2900 r.p.m., in which case lamp L–5 will remain energized.

Main winding test

It is also desirable to check the torque of the motor operating against the load of the inertia weight 22 after the starting system has been de-energized. For this purpose the output of the tachometer is connected to a comparator circuit C-6a and the reference input to this comparator is set to correspond to a tachometer output at 3100 r.p.m. As soon as the motor reaches or exceeds 3100 r.p.m. there will be a higher level output signal from C-6a to provide an enabling input to AND gate circuit CG-6. The comparator circuit C-6b has a reference input T-6 which is set to a level corresponding to an output from the torque transducer 32 which should be reached with the motor running on its main winding only. The output of comparator C-6b is connected to one of the inputs of AND gate circuits CG-6. Therefore, the speed must reach at least 3100 r.p.m. and the output of the torque transducer equal or exceed the reference input T-6, in order to have both higher level enabling signals present to the AND gate circuit CG-6. Since the torque of the motor is decreasing with speed at this point, this portion of the apparatus tests for a minimum torque value at a predetermined main winding speed, such as 3100 r.p.m. If this condition occurs there will be a higher level output from CG-6 to flip-flop FF-6, thereby extinguishing lamp L-6 and enabling the sixth input to FG-1. At the same time the sixth inputs to FG-2 and RCG will be inhibited. If the torque output of the motor falls off below the desired minimum by the time 3100 r.p.m. is reached, there will be no output from CG-6, and L-6 wil remain energized to indicate failure of the test for this reason.

No load power test

It is also desirable to determine whether the motor will reach full speed under no load while drawing no more than a desired maximum power. For this purpose the tachometer output is connected to comparator circuit C-7a, and its reference input is set to correspond to 3570 r.p.m. Thus, the motor speed must equal or exceed 3570 r.p.m. to provide a higher level enabling signal at the output of comparator C-7a, and this output is connected to one of the inputs of AND gate CG-7. The power or watts transducer 25 is connected to the input of comparator circuit C-7b, and its reference input, labeled W-7, is set to correspond to the maximum power which the motor should draw at this speed. The output of comparator C-7b is connected to an inverter circuit C-7i and its output in turn provides the other input to AND gate circuit CG-7, and this input is normally at a higher or enabling level. If the motor reaches or exceeds 3570 r.p.m. without drawing sufficient power to produce a higher level output from C-7b, and thus a low level inhibiting output from C-7i, there will be an output from CG-7 to set the memory flip-flop FF-7. In the same manner previously described, this then extinguishes lamp L-7, enabling the seventh input to AND gate circuit FG-1 and inhibits the seventh inputs to FG-2 and RCG, respectively. Conversely, if the motor draws excessive power after reaching full speed, there will be no higher level output from CG-7 and lamp L-7 will remain energized to indicate failure of this part of the test.

If the motor has passed all tests, all inputs to AND gate circuit FG-1 will be enabled, then all inputs to AND gate circuit FG-2 will be inhibited. This means that there will be a higher level signal on line 100, which is the output from FG-1, and conversely there will be a lower level signal on line 101, the ouput of FG-2. The latter line is connected to the input of an inverter circuit 103, and its output is connected through line 104 to an AND gate circuit 105. This arrangement provides an automatic check on the apparatus to assure that all of the memory flip-flop circuits have in fact been set, and that an extraneous signal has not occurred to enable AND gate circuit FG-1, when this should not have happened. Assuming that there is no erroneous signal, there will be a higher level output from AND gate circuit 105 to set the final indicator flip-flop control CF-10, and this will in turn indicate the lamp L-8 to indicate that the motor is acceptable, having passed all tests.

If the motor fails one or more of the tests, the flip-flop CF-10 will not be set and the reject lamp L-9 will light. At the same time, the appropriate one or more of the lamps L-1 . . . L-7 will indicate which tests the motor failed. If for some reason there is a discrepancy in the outputs of the memory flip-flop circuits, then one or the other of the AND gate circuits 110 and 111 will be enabled. This occurs because the AND gate 110 is connected directly to the outputs of the final AND gate circuits FG-1 and FG-2, whereas the AND gate 111 is connected to inverters 103 and 107 which provide an inverted output of the two final AND gates. If the apparatus is functioning properly, the outputs from FG-1 and FG-2 will always be different, one being at a high level and the other being at a low level. If both for some reason be at a high level, AND gate 110 will be enabled, and if both are at a low level AND gate 111 will be enabled. In either event this will in turn transmit a signal to the OR gate 112 which controls the equipment indicator lamp L-10. If this lamp is illuminated, it indicates that there has been some failure in the test equipment, and that the test should be repeated after equipment problems have been corrected.

Once the test is completed the operator closes the stop switch 115. This sets the flip-flop CF-7, and it in turn will inhibit AND gate 75 to cut off the power to the motor through the power controller 78. At the same time a one-shot multivibrator circuit 120 is energized and it applies power to a dynamic brake control 122 which causes the motor to be stopped quickly. This is accomplished conveniently by applying a direct current source 125 to the motor 10 which is under tests, providing a rapid dynamic braking of the motor, as is well known. This dissipates the energy of the inertial mass resulting from the motor having been accelerated to its full speed, and this energy, converted into heat energy in the motor, is removed from the tests apparatus with it. Hence, there is no heat build-up in the apparatus. At the same time, the flip-flop 45 is set to illuminate the reset lamp 47, indicating that the test operaton is finished and the motor may be removed.

Summary

The present invention therefore provides a novel testing apparatus which is capable of rapid dynamic testing of electric motors, and which can perform a locked rotor torque test if desired. The motor under test is driven through a complete excursion of its torque speed curve under inertial loading which permits the testing to be accomplished quickly, it being understood that an electric motor will accelerate to its rated speed along this same curve under any inertial load. By performing the test operation under inertial loading (in some cases the rotor mass itself may be sufficient) the motor will accelerate rapidly, and it is necessary only to assure there is adequate response time for the transducers used.

The go-no go testing procedure is particularly adaptable to the rapid testing procedures, where analog readout devices are not generally capable of following the outputs of the transducers. The logic devices employed for the device are readily available items that can be obtained from various commercial supply sources, and the necessary transducers are likewise commercially available.

The outputs of the transducers, in additon to providing inputs to the logic circuits, also provide an available source of signals representing the various motor parameters during a test, under dynamic conditions. These signals can conveniently be connected to suitable display devices, such an an oscilloscope, to provide for observation and comparison of these parameters, individually or in different combinations, with respect to each other or to time.

Furthermore, particularly in the testing of large motors, e.g. 5 H.P. or larger, where the motor may have a heavier and more elaborate mounting, it is possible to support the motor on a table and detect stator movement through the use of conventional strain gages. The output of such gages will be a function of the motor torque. Also, the inerita of the larger rotor in such cases may be adequate to cause a sufficiently slow acceleration for the transducers to follow. An external load, as mentioned, is not needed in these cases.

Dynamic testing of small induction motors has been accomplished at the rate of approximately three motors per minute, and the actual test operation required only about two seconds, the remaining time being occupied by loading and unloading, starting, and other manual manipulations such as recording the test results.

While the method herein described, and the form of apparatus for carrying this method into effect, constitute preferred embodiments of the invention, it is to be understood that the invention is not limited to this precise method and form of apparatus, and that changes may be made in either without departing from the scope of the invention which is defined in the appended claims.

What is claimed is:

1. Apparatus for testing electric motors to determine whether each motor can actually achieve its design torque/speed relationships within its design power requirements, comprising
   a speed responsive transducer and means for connecting it to measure the speed of rotation of the motor rotor,
   a torque sensing transducer connected to provide a variable signal output related to the torque reaction between the rotor and the stator of the motor,
   a power transducer connected to provide an output related to the electrical power consumed by the motor during a test,
   controllable means adapted to supply electrical power to a motor under test to cause the motor to accelerate,
   a plurality of comparator circuits, one for each test standard value, means providing a unique standard value reference input to each comparator circuit according to the value of the output signals required from the corresponding transducers, gate circuits controlled by said comparator circuits to provide one or the other of two different output signals in accordance with the comparision of standard reference inputs and transducer signals at predetermined motor speeds, and indicator means operative in response to the output signals of said gate circuits for indicating the success or failure of the motor to pass different portions of the test.

2. Apparatus as defined in claim 1, including means for loading the rotor of the motor under test, a selectively operable brake for holding the rotor against rotation with power applied, and wherein said logic gate circuits are also operative with said torque sensing transducer at zero speed to determine the locked rotor output of the motor.

3. Apparatus as defined in claim 2, wherein said means for loading the rotor is a rotatably mounted inertia load, a coupling for connecting the rotor of each motor under test to said load, and a rotatably mounted cradle adapted to support the stator of a motor under test, said torque sensing transducer having a connection to sense movement of said cradle due to reaction torque on the stator.

4. Apparatus for testing electric motors to determine whether each motor can actually achieve its design torque/speed relationships within its design power requirements, comprising
   a speed responsive transducer and means for connecting it to measure the speed of rotation of the motor rotor,
   a torque sensing transducer connected to provide a variable signal output related to the torque reaction between the rotor and the stator of the motor,
   a power transducer connected to provide an output related to the electrical power consumed by the motor during a test.
   controllable means adapted to supply electrical power to a motor under test to cause the motor to accelerate,
   logic circuit means receiving signals from each of said transducers and operative to compare such signals against signals of a standard value at different motor speeds to determine whether the motor under test is following its design torque/speed relationships within acceptable tolerance,
   and means responsive to completion of a test on the motor and operative to apply electrical braking power to the motor for converting its kinetic energy into heat energy to be removed from the test apparatus with the motor under test.

5. Testing apparatus of the go-no type for testing a device including a rotatable member adapted to operate at desired speeds, comprising a plurality of comparator circuits, means establishing a reference input to said comparator circuit, a plurality of transducers adapted to produce a predetermined signal in response to a desired condition in a device under test and a different signal in the absence of such desired condition, one of said transducers being responsive to the rotational speed of said member, connections from said transducers to said comparator circuits providing test inputs carrying said signals to be related to said reference inputs, a bistable device corresponding to said comparator circuits and means for setting said bistable device to a predetermined condition, an output gate circuit from said comparator circuits to said bistable device to change the condition of the bistable device in accordance with the relation of a reference input and a test input to its corresponding comparator circuit, and indicator means controlled by said bistable device to indicate the condition thereof during a testing operation and thereby to indicate the success or failure of the device under test to meet the desired conditions established by said reference means.

6. Testing apparatus as defined in claim 5, particularly for testing electrical motors, said one transducer being adapted for connection to the rotor of a motor under test to provide a signal variable with motor speed, a torque responsive transducer adapted to sense the torque output of the motor, a plurality of said comparator circuits each receiving the signal from said speed transducer and having different said reference inputs corresponding to predetermined motor speeds, a further plurality of said comparator circuits each reeciving a signal from said torque transducer and having different said reference inputs corresponding to minimum desired torque at said predetermined speeds, a plurality of said gate circuits each having an input from a corresponding one of said speed comparator circuits and a corresponding one of said torque comparator circuits, a plurality of said bistable devices connected to be operated by corresponding ones of said gate circuits, and a separate indicator means controlled by each of said bistable devices to indicate success or failure of the motor to achieve the minimum desired torque at the predetermined corresponding speed.

7. Testing apparatus as defined in claim 6 including a brake adapted to hold a motor under test against rotation and a control circuit for energizing said brake while power is applied to the motor, an additional comparator receiving a signal from said one transducer and having a reference input corresponding to zero motor speed, a further comparator receiving a signal from said torque responsive transducer and having a reference input corresponding to the minimum desired locked-rotor torque of the motor, a further gate circuit having inputs from each of said additional and further comparators and from said brake control circuit, a further bistable device connected to be operated by said further gate circuit, and a further indicator means controlled by said further bistable device to indicate success or failure of the motor to achieve a minimum torque with its rotor locked against rotation.

8. Testing apparatus as defined in claim 6, including a checking circuit arranged to indicate a failure of any of said bistable devices to drive its corresponding indicator means in accordance with the outputs from said gate circuits.

9. Testing apparatus as defined in claim 6, including a power comparator having a reference input corresponding to a desired motor power consumption at a predetermined speed, a further speed comparator receiving a signal from said one transducer and having a reference input corresponding to the speed at which the power consumption test is made, a power sensing gate circuit having inputs from said power comparator and from said further speed comparator, a power test bistable device controlled by said power comparator, and power test indicator means controlled by said power test bistable device.

10. The methd of testing electrical motors comprising the steps of
  (a) connecting torque and speed responsive transducers to the motor to be tested,
  (b) applying power to the motor and permitting the motor to accelerate rapidly to its full speed, whereby the motor traverse its full inherent torque/speed relationships,
  (c) comparing the actual output of said transducers during the test operation against reference values corresponding to the outputs which would be received from a motor meeting test specifications,
  (d) indicating any variance of the transducer outputs from the reference values to identify the failure of a motor to meet the test specifications, and
  (e) dynamically braking the motor by application of electrical force to remove the energy of the rotating motor from the test system as heat energy in the motor under test.

11. The method defined in claim 10, wherein step (c) includes comparison of the transducer output with the reference values at a plurality of times when the motor achieves predetermined speeds during its acceleration to determine whether the motor is following its design torque/speed relationship within acceptable deviation.

12. The method defined in claim 10, including the additional step of preventing the motor rotor from rotating and applying power to the motor to determine the locked rotor torque of which the motor under test is capable.

References Cited

UNITED STATES PATENTS

| | | | |
|---|---|---|---|
| 1,401,740 | 12/1921 | Schaf | 73—134X |
| 3,052,117 | 9/1962 | Miller et al. | 73—136 |
| 3,165,926 | 1/1965 | Orr et al. | 73—161 |

RICHARD C. QUEISSER, *Primary Examiner.*

JERRY W. MYRACLE, *Assistant Examiner.*